(12) United States Patent
Stope

(10) Patent No.: US 11,560,961 B1
(45) Date of Patent: Jan. 24, 2023

(54) INLINE, ELASTOMERIC ONE-WAY VALVE

(71) Applicant: Vernay Laboratories, Inc., Hapeville, GA (US)

(72) Inventor: James Stope, Waynesville, OH (US)

(73) Assignee: Vernay Laboratories, Inc., Hapeville, GA (US)

( * ) Notice: Subject to any disclaimer, the term of this patent is extended or adjusted under 35 U.S.C. 154(b) by 0 days.

(21) Appl. No.: 17/401,232

(22) Filed: Aug. 12, 2021

(51) Int. Cl.
*F16K 15/14* (2006.01)

(52) U.S. Cl.
CPC ....... *F16K 15/145* (2013.01); *Y10T 137/6109* (2015.04)

(58) Field of Classification Search
CPC ................. F16K 15/145; F16K 15/148; Y10T 137/6109; Y10T 137/7888
See application file for complete search history.

(56) References Cited

U.S. PATENT DOCUMENTS

| | | | | |
|---|---|---|---|---|
| 2,329,960 A | * | 9/1943 | Verheul | F16K 15/148 137/515 |
| 2,913,000 A | * | 11/1959 | Roberts | F16K 15/148 137/854 |
| 3,903,922 A | * | 9/1975 | Buckman | F16K 15/145 137/852 |
| 4,756,982 A | * | 7/1988 | McCartney, Jr. | H01M 50/394 137/516.25 |
| 4,827,973 A | | 5/1989 | Boehmer | |
| 5,975,360 A | | 11/1999 | Ophardt | |
| 8,157,134 B2 | | 4/2012 | Ophardt | |
| 9,175,674 B2 | | 11/2015 | Ophardt et al. | |
| 2005/0028873 A1 | | 2/2005 | Martin et al. | |
| 2019/0299378 A1 | | 10/2019 | Horning et al. | |

OTHER PUBLICATIONS

Product literature entitled "Vernay® Duckbill Check Valves," by Vernay Laboratories, Inc., 4 pages, 2008.
International Search Report and Written Opinion dated Nov. 10, 2022 pertaining to PCT Application No. PCT/US2022/038782, filed Jul. 29, 2022; 11 pages.

\* cited by examiner

*Primary Examiner* — Kevin F Murphy
(74) *Attorney, Agent, or Firm* — Thompson Hine LLP

(57) ABSTRACT

An elastomeric check valve that may be installed within pre-existing process lines or plumbing that includes an internal bore. In various aspects the disclosed check valve has a stem or stem assembly configured to engage the bore to retain the check valve in place and an elastomeric sealing disk or member. At least a radially outer portion of the elastomeric sealing disk or member is biased or biasable in a selected direction away from a plane that is coincident with a central portion of the elastomeric sealing disk. Fluid may flow through a channel in the stem through a stem assembly and around the elastomeric sealing disk in the selected direction, but is substantially prevented from flowing around the elastomeric sealing disk in a direction opposite to the selected direction, when the check valve is installed within the bore.

17 Claims, 10 Drawing Sheets

INLINE, ELASTOMERIC ONE-WAY VALVE

TECHNICAL FIELD

The present disclosure is directed to fluid control valves and, more particularly, to one-way or so-called "check valves" for use in process lines and plumbing for the transport and handling of fluids. The devices are configured for use in, but not limited to, retrofit installations within pre-existing tubular components such as pipes as well as vessel inlets and outlets.

BACKGROUND

One-way or so-called "check valves" are used in a variety of applications to control fluid flow through process lines and plumbing, including various systems for the transport of source, intermediate, product, and waste fluids. A processes design may call for such a valve in order to control the direction of fluid flow, allowing for flow in one direction but not the opposite direction. Such valves are, of course, available as off-the-shelf, inline check-valve assemblies, but such assemblies take up space and have particular connection requirements (e.g., type, location, and orientation of inlet and outlet connectors) that the process design must take into account. Designing for and sourcing compatible inline check valve assemblies can add significant cost and time when specifying complex combinations of process devices and plumbing. In the case of less detailed designs or, especially, in retrofit adaptations of existing process systems and devices, adding inline check valve assemblies may require that sections of tubing, hoses, or pipes be cut and/or rerouted in order to allow for the installation of those assemblies. Redesigning process systems or devices to incorporate inline check valve assemblies may be cost and time prohibitive, and in some cases there may not be enough space available to incorporate a particular assembly.

SUMMARY

The applicant has developed an improved inline, elastomeric check valve that does not require an external housing. Instead, the valve may be installed within pre-existing process lines, or any other sort of plumbing that includes an internal bore with a smooth inner diameter. In particular, the valve allows for retrofit installation within many pre-existing process lines and within or adjacent to many pre-existing vessel inlets or outlets so as to add one-way fluid control without major modification of such elements.

In a first aspect, the disclosed check valve has a stem configured to engage a bore having a predetermined internal diameter, an elastomeric sealing disk having a disk diameter greater than the predetermined internal diameter, and a neck interconnecting the elastomeric sealing disk with the stem. At least a radially outer portion of the elastomeric sealing disk is biased or biasable in a selected direction away from a plane that is coincident with a central portion of the elastomeric sealing disk, the plane being perpendicular to a longitudinal axis of the stem, such that an effective diameter of the radially outer portion is greater than or equal to the predetermined internal diameter, but less than the disk diameter, when the elastomeric sealing disk is so biased. The stem defines at least one channel for fluid communication between the neck and an end of the stem opposite the neck, wherein a fluid may flow through the channel and around the elastomeric sealing disk in the selected direction, but is substantially prevented from flowing around the elastomeric sealing disk in a direction opposite to the selected direction, when the check valve is installed within the bore. The elastomeric sealing disk may be biased in the selected direction by the intrinsic configuration of the elastomeric sealing disk, by interference with the bore, or by a combination thereof.

In a second aspect, the disclosed check valve has a resilient stem assembly configured to engage a bore having a predetermined internal diameter and an elastomeric sealing disk having a disk diameter greater than the predetermined internal diameter. At least a radially outer portion of the elastomeric sealing disk is biased or biasable in a selected direction away from a plane that is coincident with a central portion of the elastomeric sealing disk, the plane being perpendicular to a longitudinal axis of the stem assembly, such that an effective diameter of the radially outer portion is greater than or equal to the predetermined internal diameter, but less than the disk diameter, when the elastomeric sealing disk is so biased. The stem assembly comprises an open framework connected to the elastomeric sealing disk, wherein a fluid may pass through the open framework and around the elastomeric sealing disk in the selected direction, but is substantially prevented from passing around the elastomeric sealing disk in a direction opposite to the selected direction, when the check valve is installed within the bore. The elastomeric sealing disk may be biased in the selected direction by the intrinsic configuration of the elastomeric sealing disk, by interference with the bore, or by a combination thereof.

In a third aspect, the disclosed check valve has a stem configured to engage a bore having a predetermined internal diameter, a longitudinal channel extending across an exterior surface of the stem, and an elastomeric sealing member connected to one end of the stem and configured to sealingly engage with the bore. A radially outer portion of the elastomeric sealing member is disposed across the channel and is biased in a direction toward the opposite end of the stem with respect to a plane that is coincident with a central portion of the elastomeric sealing member and perpendicular to a longitudinal axis of the stem, such that the radially outer portion will seal against the bore when moved oppositely from the direction of the bias. A fluid may flow through the channel and around the elastomeric sealing member in the direction of the bias, but is substantially prevented from flowing around the elastomeric sealing disk in a direction opposite to the direction of the bias, when the check valve is installed within the bore.

Those of skill will appreciate that when the applicant states that a fluid is "substantially prevented" from flowing or passing around the elastomeric sealing disk, the elastomeric sealing disk will function to substantially prevent flow in a direction towards the concave side of the sealing disk up to a predetermined or maximum service pressure, whereupon the sealing disk may invert or become damaged so as to no longer prevent such flow. Those of skill will also appreciate that one-way valves, check valves, sealing disks, sealing members, and the like may permit some leakage past the valve Thus the term "[a fluid is] substantially prevented" will be understood to mean that bulk flow of a fluid is prevented up to a differential pressure causing failure of the check valve.

DETAILED DESCRIPTION

Figure 1:
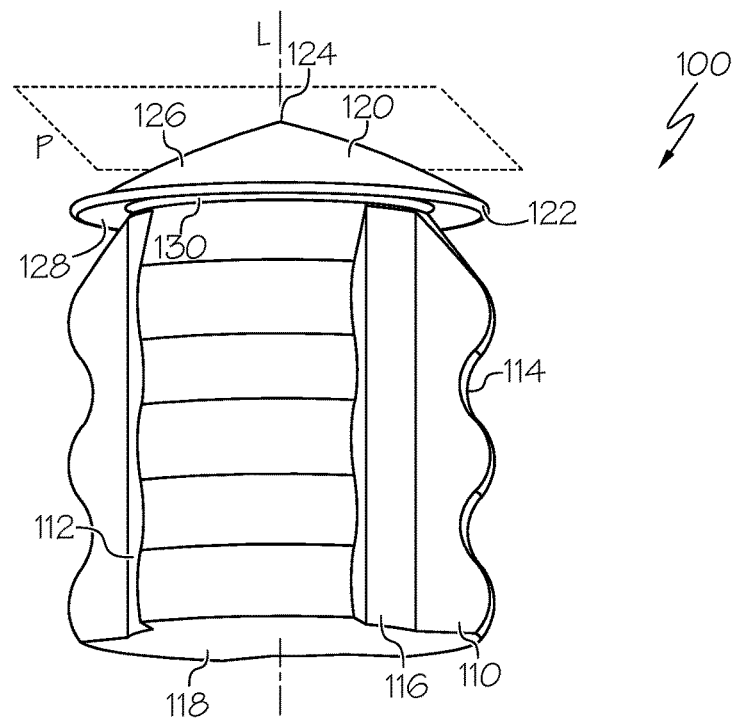
FIG. 1 is a perspective view of an exemplary embodiment of a first aspect of the disclosure.

Beginning with FIG. 1, a first aspect of a check valve 100 includes a stem 110 configured to engage a bore 10 having a predetermined internal diameter (shown in FIG. 2), an elastomeric sealing disk 120 having a disk diameter greater than the predetermined internal diameter, and a neck 130 interconnecting the elastomeric sealing disk with the stem. As shown in FIG. 1, the stem 110 may include a generally cylindrical body portion 112, although as shown in alternative embodiments and other aspects the stem may include one or more plate like body portions having a '−'-like (minus-like), '+'-like (plus-like), '*'-like (asterisk-like) or other geometrically shaped cross section. The stem 110 may include a plurality of lugs 114 configured to engage the walls of the bore 10, where the lugs form a macro-textured, radially outermost surface. For example, the lugs 114 may have an undulating texture (as shown), a sawtooth texture, a square-wave texture, or other regularly occurring surface variation. It will be appreciated that while the illustrated macro-textures repeat along a longitudinal axis "L" of the stem 110, such textures may repeat about the circumference of the stem 110, in intermediate orientations between longitudinal and circumferential repeating orientations, or in combinations of such orientations. The macro-texture provides a plurality of protrusions for engaging the walls of the bore 10 interspaced with a plurality of gaps into which the protrusions may distort. Accordingly, the lugs 114 may create an interference fit with the bore 10 without requiring potentially destructive levels of insertion force during installation. The stem 110 defines at least one channel 116 for fluid communication between the neck 130 and an end of the stem 118 opposite the neck. For example, channels 116 may be formed between pairs of lugs 114, as shown in FIG. 1, formed upon an exterior surface of the generally cylindrical or other-shaped body portion 112, or formed within the interior of the generally cylindrical or other-shaped body portion 112.

Figure 2:
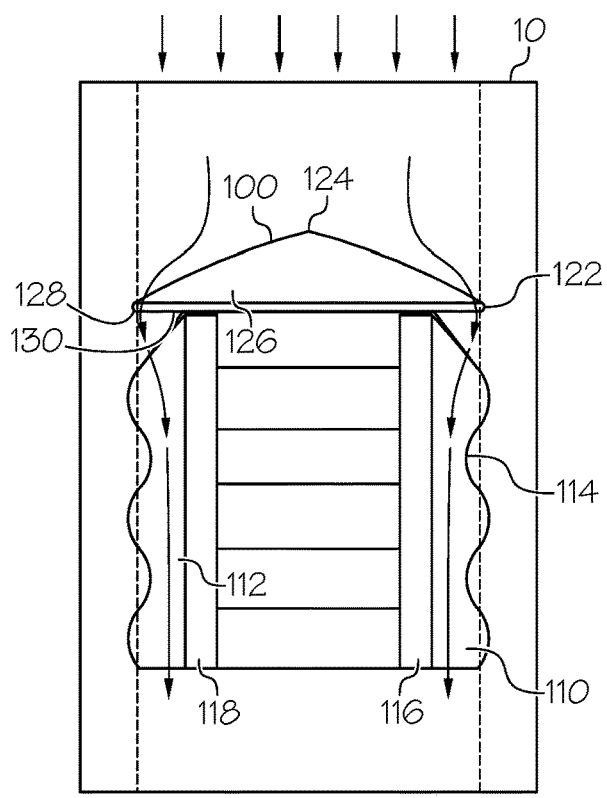
FIG. 2 is a side view of the exemplary embodiment of FIG. 1 installed within a bore.

At least a radially outer portion 122 of the elastomeric sealing disk 120 is biased or biasable in a selected direction away from a plane "P" coincident with a central portion 124 of the sealing disk. The plane P is simply a reference plane, oriented perpendicular to a longitudinal axis of the stem 110, that may serve as a proxy for a flattened configuration of the elastomeric sealing disk 120, which has a disk diameter greater than the predetermined internal diameter of the bore 10 in that flattened configuration. Because the radially outer portion 122 of the elastomeric sealing disk 120 is biased in a preselected direction and/or biasable in a selectable direction away from the plane P, so as to form a hollow frusto-conical, skirt-like, or umbrella-like shape, the radially outer portion will have an effective diameter that is greater than or equal to the predetermined internal diameter of the bore 10, but less than the disk diameter, when in the biased position, i.e., when so biased. When the elastomeric sealing disk 120 is biased by the intrinsic configuration of the disk—i.e., is molded or formed such that the radially outer portion 122 is positioned away from the plane P through the central portion 124 of the elastomeric sealing disk—the effective diameter may be greater than the predetermined internal diameter so as to interfere with and be further biased by interference with the walls of the bore 10. This may tend to improve the quality of the seal at the cost of increased cracking pressure of the check valve 100. Of course, it will be appreciated that the effective diameter will become essentially equal to the predetermined internal diameter once the check valve 100 has been installed with the bore 10. As shown in FIG. 2, forward flow towards a convex side 126 of the biased elastomeric sealing disk 120 will tend to collapse the disk, permitting flow around and past the check valve 100. Reverse flow towards a concave side 128 of the biased elastomeric sealing disk 120 will tend to expand the disk, causing the radially outer portion 122 to seat even more firmly against the bore 10 and thus substantially prevent reverse flow across the check valve 100.

Figure 3A:
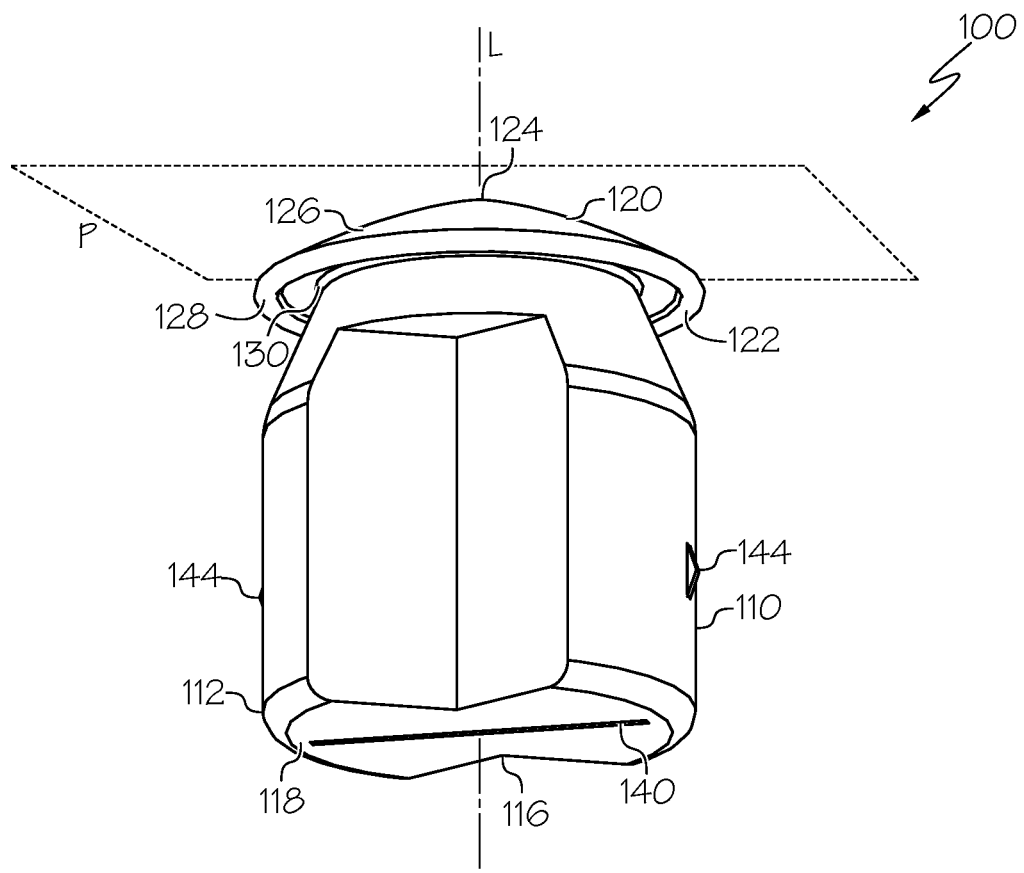
FIG. 3A is a perspective view of a first alternative embodiment of the first aspect.
Figure 3B:
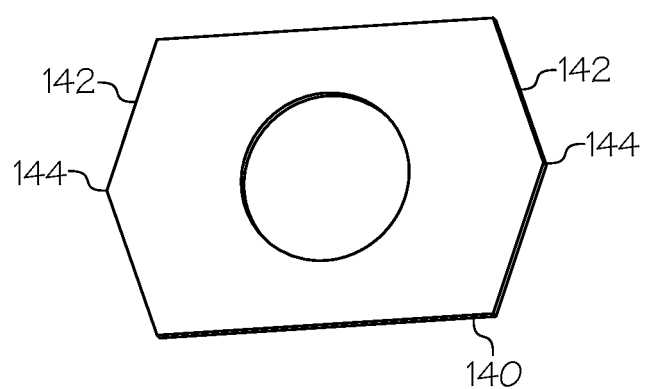
FIG. 3B is a perspective view of an insert 140 to be embedded within the embodiment of FIG. 3A in the same orientation as shown.

Turning to FIGS. 3A and 3B, an alternative embodiment of the first aspect is shown which varies in two exemplary respects. First, the generally cylindrical body portion 112 does not include lugs 114. The generally cylindrical body portion 112 may include a rigid or resilient insert 140 (more fully shown in FIG. 3B) having a plurality of pointed or sharp-edged retaining features 144 positioned to engage the walls of the bore 10 where, for example, lateral sides 142 include terminal corners, barbs, or similar projecting structures configured to engage the walls of the bore. The insert 140 may be, for example, a metal or plastic insert comprising an O-shape or a C-shape where the opposing lateral sides 142, or opposing legs of the C-shape, include such retaining features 144, with a polymeric or elastomeric body portion 112 overmolded upon the insert. In this and other embodiments, the stem 110 (and generally cylindrical body portion 112) and elastomeric sealing disc 120 may be an integrally formed, homogeneous elastomeric shape. Second, the generally cylindrical body portion 112 includes a channel 116 formed across the exterior surface of the body portion, from the neck 130 to the end of the stem 118 opposite the neck, as suggested above. Similar to the lugs 114, the generally cylindrical body portion 112 and spikes 144 may create an interference fit with the bore 10, while the exterior channel 116 or channels provide gaps into which the body portion may distort so as to diminish required levels of insertion force during installation.

Figure 4:
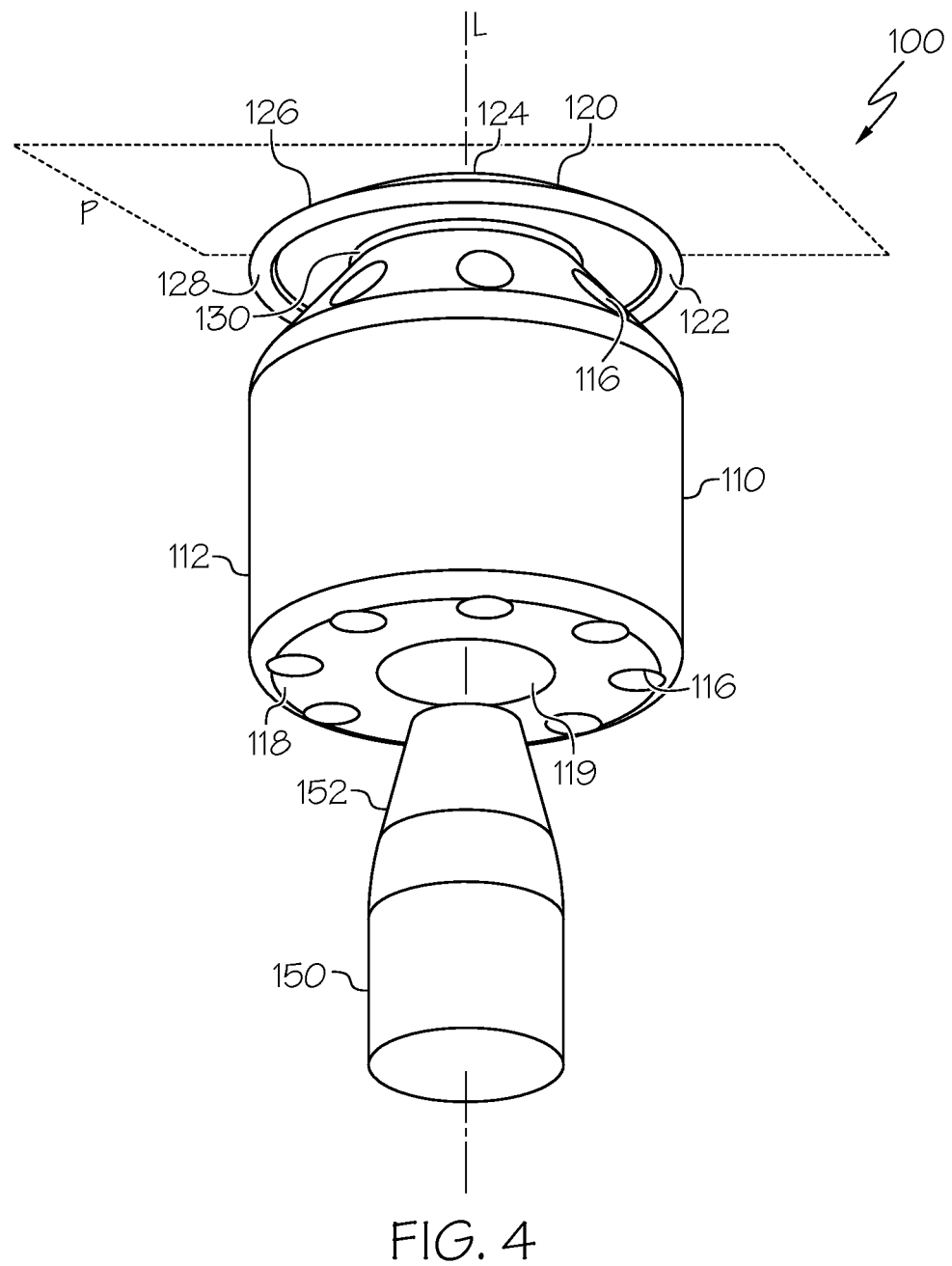
FIG. 4 is a perspective view of a second alternative embodiment of the first aspect.

Turning to FIG. 4, another alternative embodiment of the first aspect is shown which varies in two exemplary respects. First, the generally cylindrical body portion 112 includes a channel or channels 116 formed within the interior of the body, and extending from the neck 130 to the end of the stem 118 opposite the neck, as suggested earlier above. Second, the generally cylindrical body portion 112 includes a recess 119 which may serve multiple purposes. The recess 119 may receive an insert 150 that expands the generally cylindrical body portion 112 to produce a compression fit with a bore 10, greatly diminishing required levels of insertion force during installation while permitting greater resistance to slippage within the bore. For example, a polymeric or elastomeric generally cylindrical body portion 112 may receive a harder (Shore hardness) insert 150 formed from a polymeric or metal material and sized to expand the recess 119, compressing the generally cylindrical body portion 112 against the bore 10 (not shown in this figure). The insert may include a tapered leading end 152 for piloting insertion into the recess 119, and may have an outside diameter that is larger than the inside diameter of the recess so as to expand the generally cylindrical body portion 112 surrounding the recess to produce a compression lock against the bore.

Figure 5:
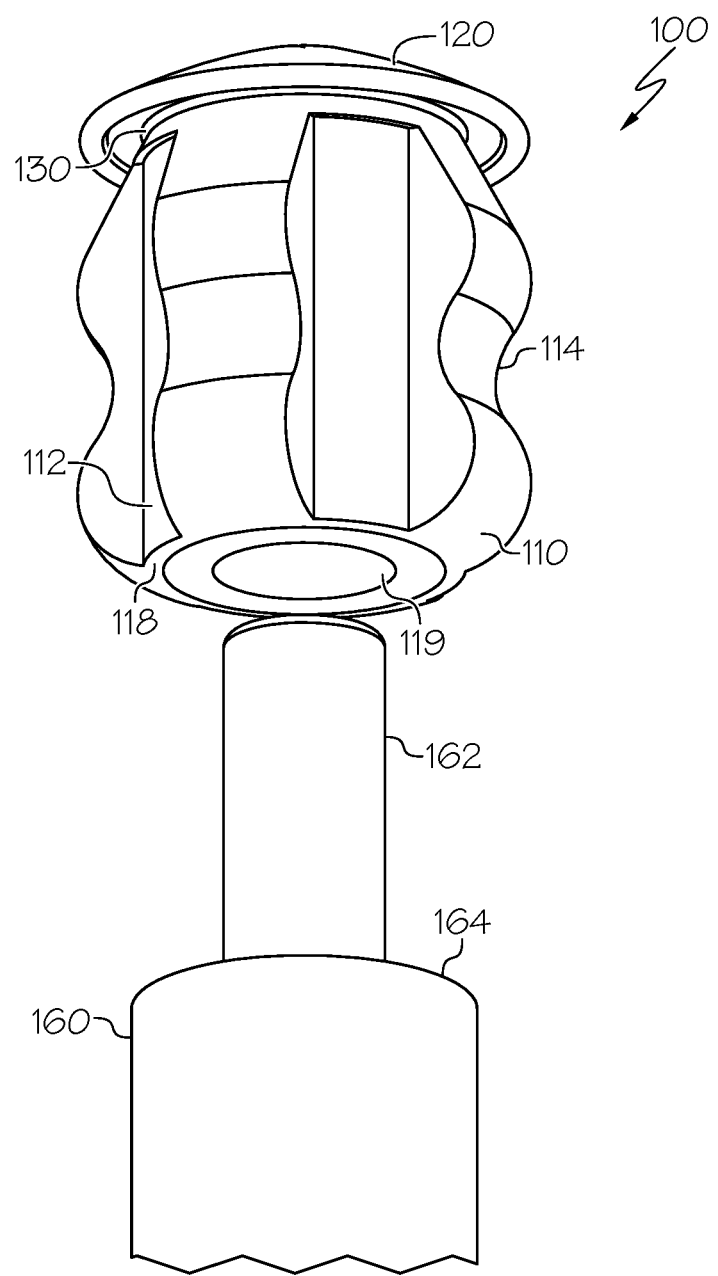
FIG. 5 is a is a perspective view of a third alternative embodiment of the first aspect and a complementary installation tool.

FIG. 5 shows yet another alternative embodiment combining features of the foregoing embodiments, particularly, a generally cylindrical body portion 112, lugs 114, and a recess 119. The recess 119 is shown in relation to an installation tool 160, and may extend to the neck 130 or sealing disk 120 of the valve 100. The installation tool 160 may have an end portion 162 sized for insertion within the recess 119 but with a length greater than the longitudinal extent of the recess. During insertion within a bore 10, the end portion 162 exerts a force against the neck 130 or sealing disk 120, and the lugs 114 experience a fictional force with the walls of the bore, stretching the stem 110 and causing its exterior to shrink in diameter, reducing the frictional force exerted on the lugs 114 and thus required levels of insertion force during installation. The installation tool 160 may optionally include an outwardly projecting step 164 which may abut against the end of the stem 118 to limit the stretching of the generally cylindrical body portion 112 in order to prevent potential damage to the check valve.

Figure 6A:
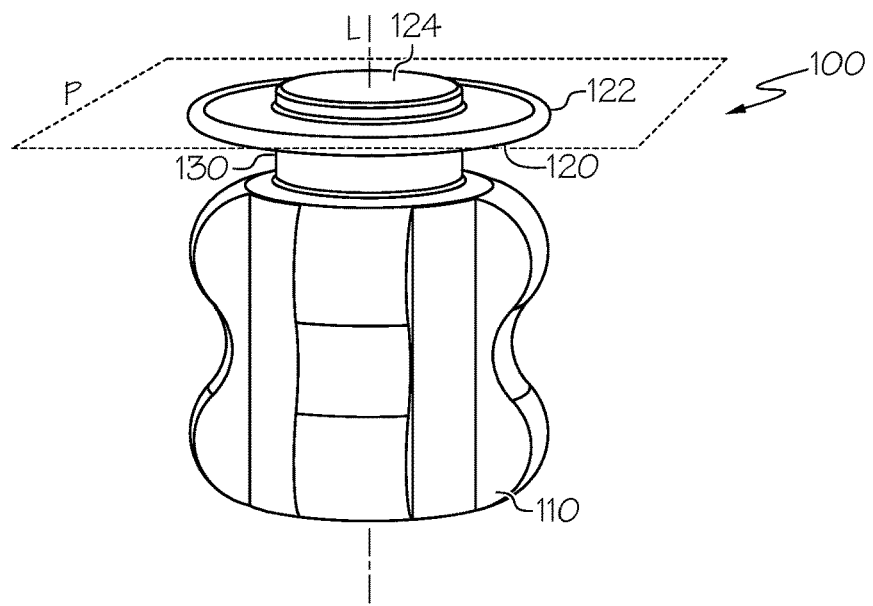
FIGS. 6A-C are views of a fourth alternative embodiment of the first aspect.
Figure 6B:
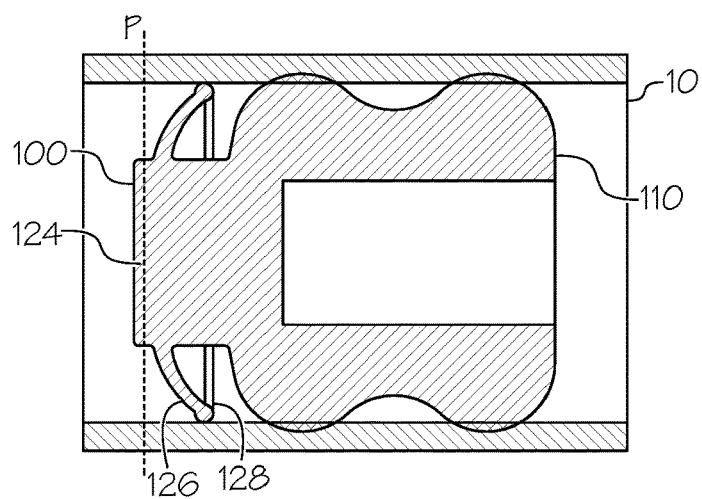
Figure 6C:
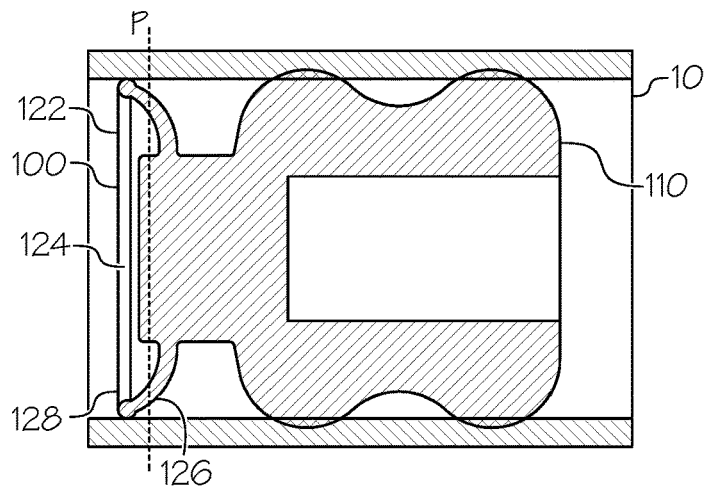

FIGS. 6A-6C illustrate a further alternative embodiment of the first aspect. In contrast to the embodiments shown in FIGS. 1-5, the elastomeric sealing disk 120 is not biased by the intrinsic configuration of the disk—i.e., is not molded or formed such that the radially outer portion 122 is positioned away from the plane P through the central portion 124 of the elastomeric sealing disk—but rather biased by the bore 10 upon insertion of the check valve 100 within the bore—i.e., molded or formed such that radially outer portion 122 is within the plane P through the central portion 124 of the elastomeric sealing disk, but selectively biasable upon installation in a direction away from the plane—due to the disk diameter being greater than the predetermined inner diameter of the bore 10. If the check valve 100 is simply inserted and set within a bore 10 then, as shown in FIG. 6B, a concave side 128 of the biased elastomeric sealing disk 120 will face the stem 110, and flow towards the opposite, convex side 126 of the disk (and the toward the stem 110) will tend to collapse the disk, permitting flow through the check valve. Reverse flow towards the concave side 128 of the biased elastomeric sealing disk 120 (and away from the stem 110) will tend to expand the disk, causing the radially outer portion 122 to seat against the bore 10 and thus substantially prevent reverse flow across the check valve 100. In contrast, if the check valve 100 is inserted within, and then partially withdrawn within, a bore 10 then as shown in FIG. 6C a convex side 126 of the biased elastomeric sealing disk 120 will face the stem 110, and flow towards the opposite, concave side 128 of the disk (and away from the stem 110) will tend to collapse the disk, permitting flow through the check valve. Reverse flow towards the concave side 128 of the biased sealing disk 120 (and toward the stem 110) will tend to expand the disk, causing the radially outer portion 122 to seat against the bore and thus substantially prevent reverse flow across the check valve 100. Those of skill will appreciate that above a predetermined or maximum service pressure, which will vary depending upon the diameter and thickness of the disk 120 in comparison to the predetermined internal diameter of the bore 10, the elastic modulus of the elastomeric sealing disk material, and other factors, the disk may invert so as to alter the directionality of the valve from that set upon installation, or else become damaged so as to no longer effectively prevent reverse flow.

Figure 7A:
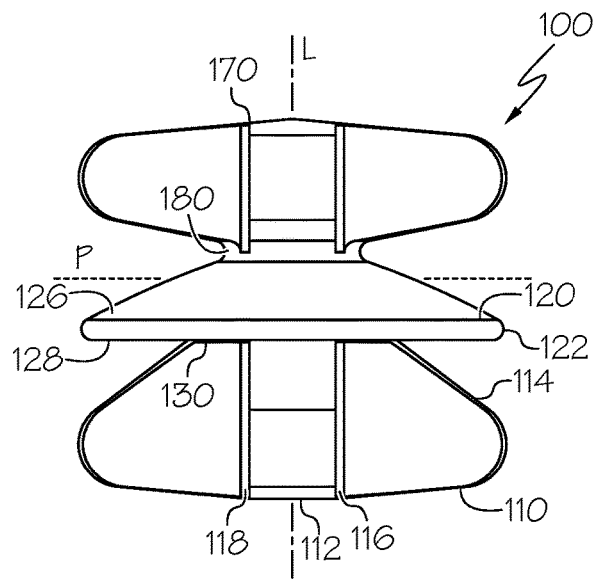
FIGS. 7A-D are views of a fifth alternative embodiment of the first aspect.
Figure 7B:
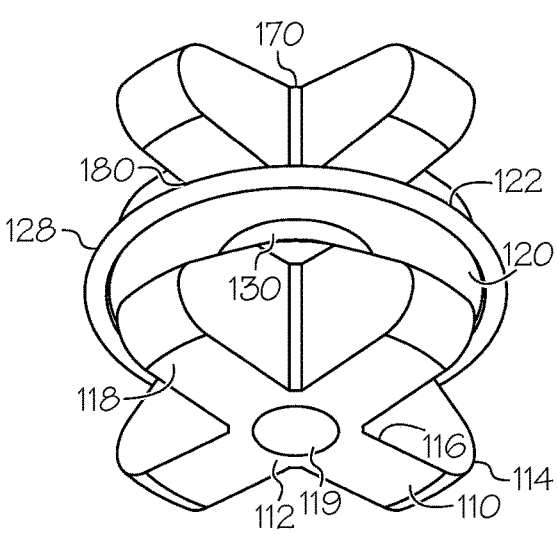
Figure 7C:
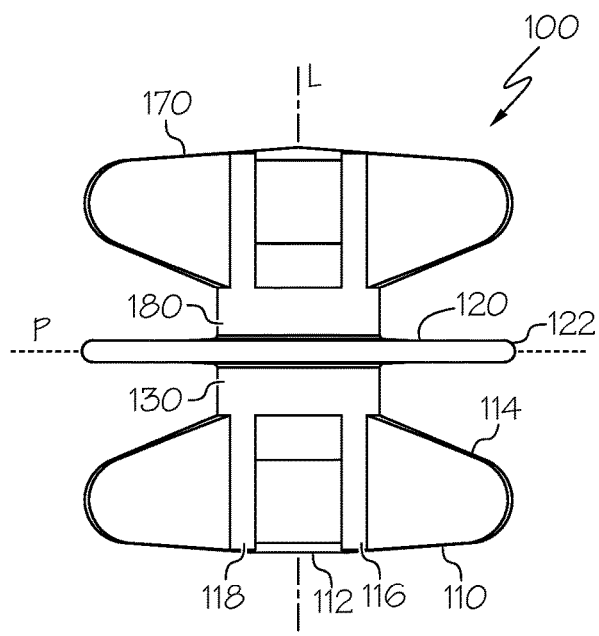
Figure 7D:
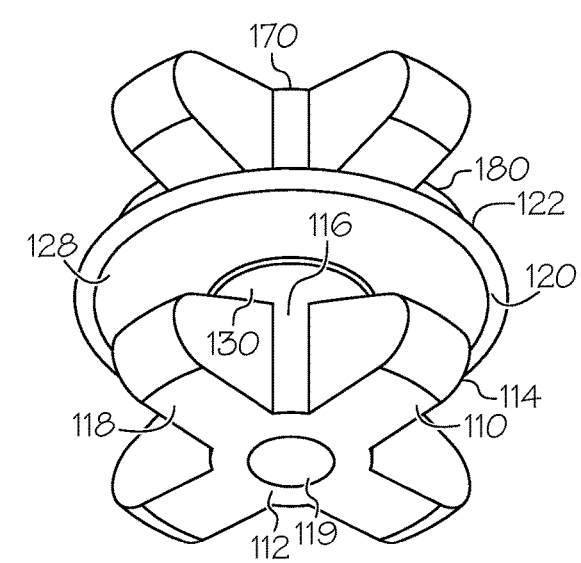

FIGS. 7A-7D illustrate yet further alternative embodiments of the first aspect. Such valves 100 may include second stem 170, disposed opposite the first stem 110 from the elastomeric sealing disk 120, that is connected to the elastomeric sealing disk 120 by a second neck 180. The second stem 170 may allow for the necks 130, 180 to have a reduced diameter in comparison that in the aforedescribed check valves, and/or the stems 110, 170 to have a reduced longitudinal length in comparison to that of the aforedescribed check valves. The second stem 170 and second neck 180 may also enhance centering of the elastomeric sealing disk 120, especially in curved tubing due to centering support being provided on both sides of the disk. As shown in FIGS. 7A-B, the elastomeric sealing disk 120 may be biased by the intrinsic configuration of the sealing disk towards one stem, e.g., stem 110, and at least one of the stems 110, 170 may include a recess 119. Alternately, as suggested by the symmetrical structure shown in FIGS. 7C-D, the elastomeric sealing disk 120 may be biased by a bore upon insertion of the check valve 100 within the bore due to the radially outer portion 122 having a disk diameter which is greater than the predetermined inner diameter of the bore. The latter embodiment would be set and function substantially as described in connection with the embodiment shown in FIGS. 6A-C.

Figure 8A:
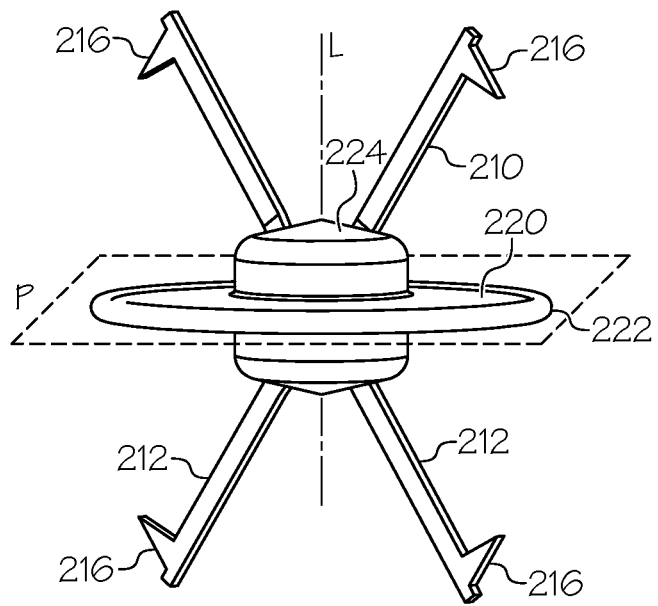
FIG. 8A is a perspective view of an exemplary embodiment of a second aspect of the disclosure.
Figure 8B:
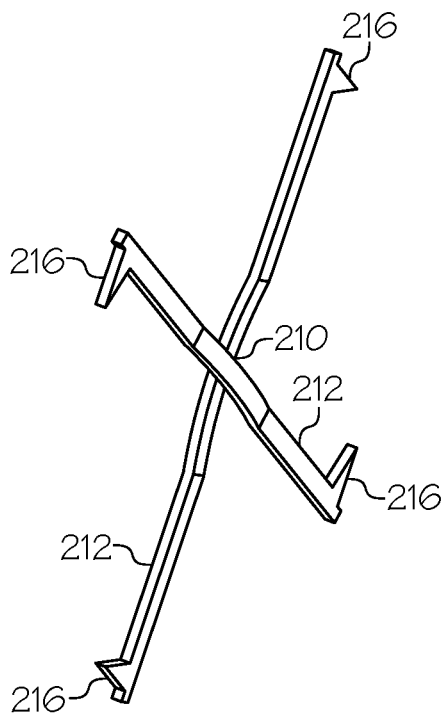
FIG. 8B is a perspective view of an exemplary stem assembly embedded within the embodiment of FIG. 8A.
Figure 8C:
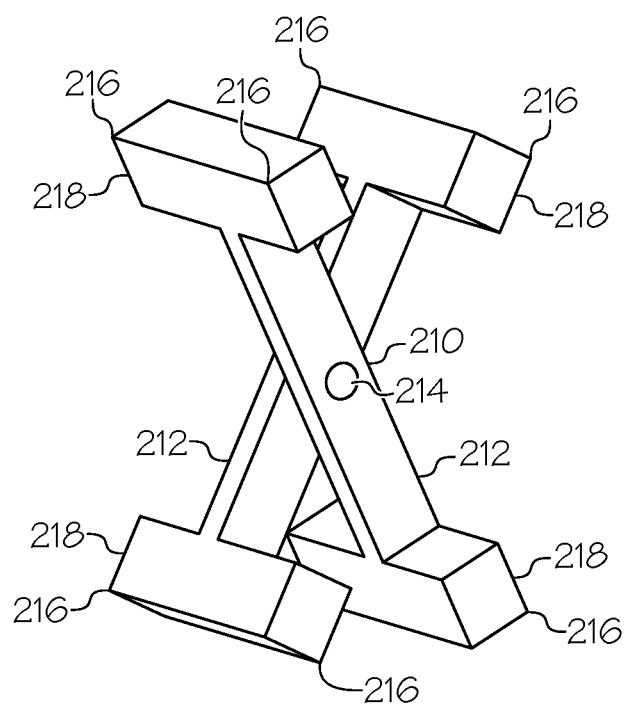
FIG. 8C is a perspective view of another exemplary stem assembly.
Figure 9A:
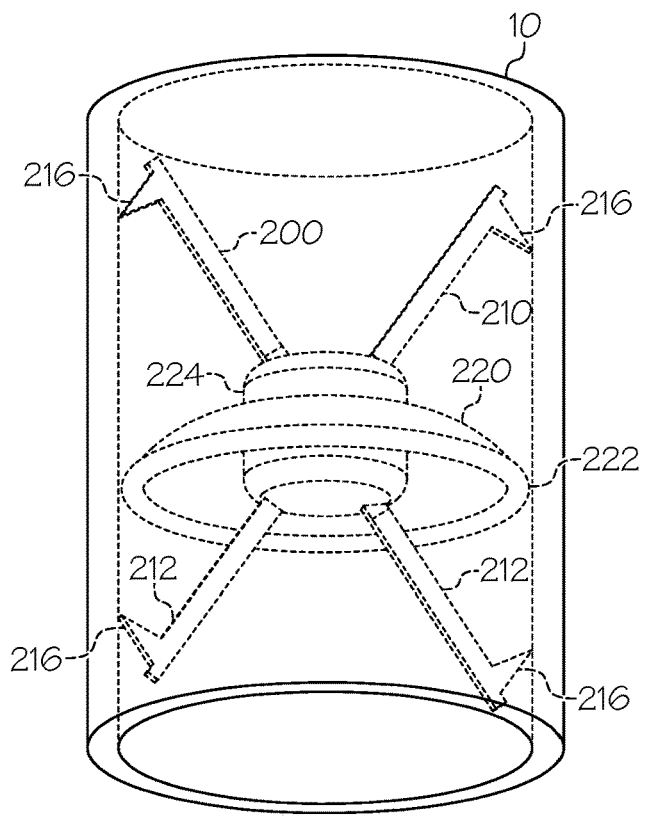
FIG. 9A is a perspective view of the exemplary embodiment of FIG. 8A installed within a bore.
Figure 9B:
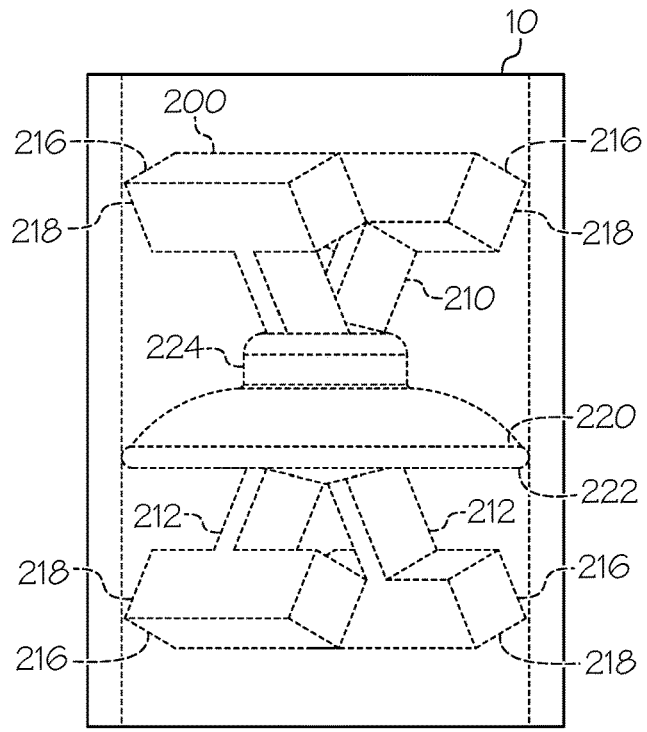
FIG. 9B is a perspective view of another exemplary embodiment of the second aspect of the disclosure.

In a second aspect, shown in FIGS. 8A-8C and 9A-B, a check valve 200 has a resilient stem assembly 210 configured to engage a bore 10 having a predetermined internal diameter and an elastomeric sealing disk 220 having a diameter greater than the predetermined internal diameter. At least a radially outer portion 222 of the elastomeric sealing disk 220 is biasable in a direction away from a plane P through a central portion 224 of the elastomeric sealing disk. As shown, the plane P coincides with the pre-installation configuration of the elastomeric sealing disk 220, however, as in the devices shown in FIGS. 1-5 and 7A-B, the plane P may be simply a reference plane coincident with a central portion 224 of the elastomeric sealing disk 220, oriented perpendicular to a longitudinal axis "L" of the stem assembly 210 and serving as a proxy for a flattened configuration of the disk. Thus, as shown in FIG. 9A, the elastomeric sealing disk 220 may be biased by the bore 10 upon insertion of the check valve 200 within the bore due to the radially outer portion 222 having an actual diameter which is greater than the predetermined inner diameter of the bore. However, in other embodiments, the sealing disk 220 may be biased by the intrinsic configuration of the sealing disk—i.e., molded such the radially outer portion 222 is positioned away from the plane P through the central portion 224 of the elastomeric sealing disk 222—toward or away from a particular portion of the stem assembly The resilient stem assembly 210 may comprise an open framework connected to the elastomeric sealing disk 220. The open framework may include a plurality of legs 212 having pointed or sharp-edged retaining features 216 positioned to engage the walls of the bore 10 where, for example, each leg includes terminal corners, barbs, or similar projecting structures (as shown in FIGS. 8B and 8C). In general, the open framework may be any substantially planar or three-dimensional structure having open volumes between framework members, so that, for further example, the open framework may include a plurality of legs 212 forming a bipod or X-shaped structure (as shown in FIGS. 8B and 8C), a tripod or a bi-tripod structure (two oppositely disposed tripods with member legs converging upon a single point or region of intersection), a pyramid or a bi-pyramid structure (two oppositely disposed pyramids, each with four or more member legs, converging upon a single point or region of intersection and cross-leg members interconnecting the member legs opposite the single point or region), or the like. The plurality of legs 212 may be elastically connected together, for example through the sealing disk 220 itself as suggested in FIG. 8A, and extrinsically resilient (due to the elasticity of the surrounding material of the sealing disk 220), or may be fixedly connected together, for example through welding or use of adhesives as suggested in FIG. 8B, and intrinsically resilient (due to spring-like resiliency of the free ends of the legs), or may be connected together by one or more pivots 214 (as shown in FIG. 8C) and extrinsically resilient (again due to use the sealing disk 220 to bias the legs into a preselected configuration), or may use combinations of such elements. The plurality of legs 212 may include additional biasing members (not shown) tending to spread the plurality of legs 212 apart. For example, a biasing member may be a resilient cross-member, such as a compression spring or flat spring, interconnecting medial or distal portions of pairs of legs. The plurality of legs 212 may further include one or more resilient or rigid cross-members 218 disposed at a distal end of a leg for creating multiple points of contact with the walls of the bore 10 as shown in FIGS. 8C and 9B. The resilient stem assembly 210 and open framework may be a metal or plastic insert upon which the sealing disk 220 is overmolded. Accordingly, the plurality of legs (and any cross-members or other members, if present) may be compressed together during installation by a tool such as a pair of channel locks or needle-nose pliers, and released to spring outward against the walls of the bore to set the valve 200 via engagement of the retaining features 214.

Figure 10A:
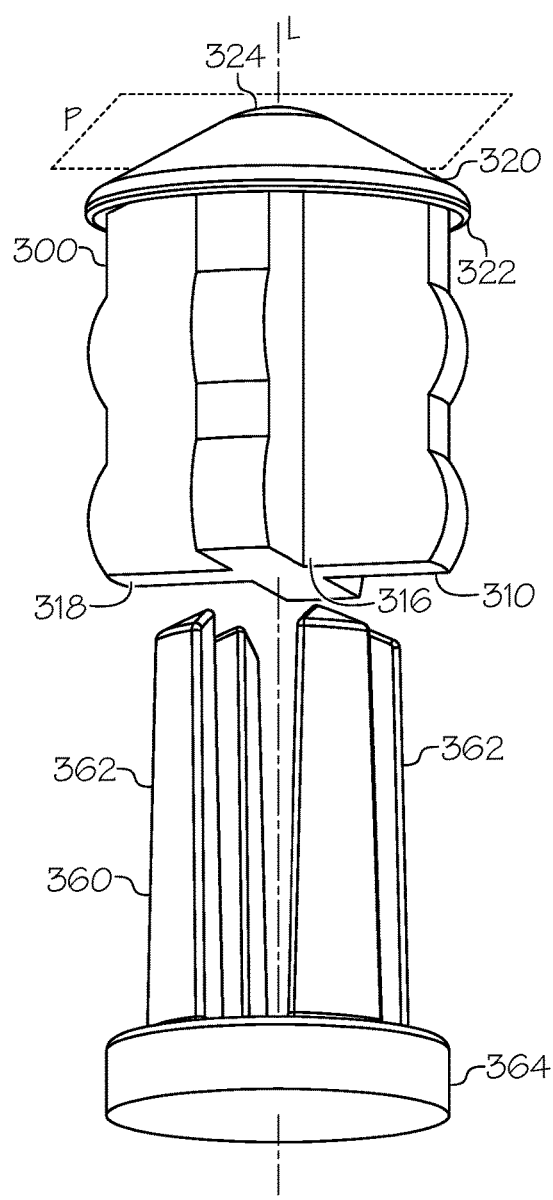
FIGS. 10A and 10B are perspective views of exemplary embodiments of a third aspect of the disclosure and respective, complementary installation tools.
Figure 10B:
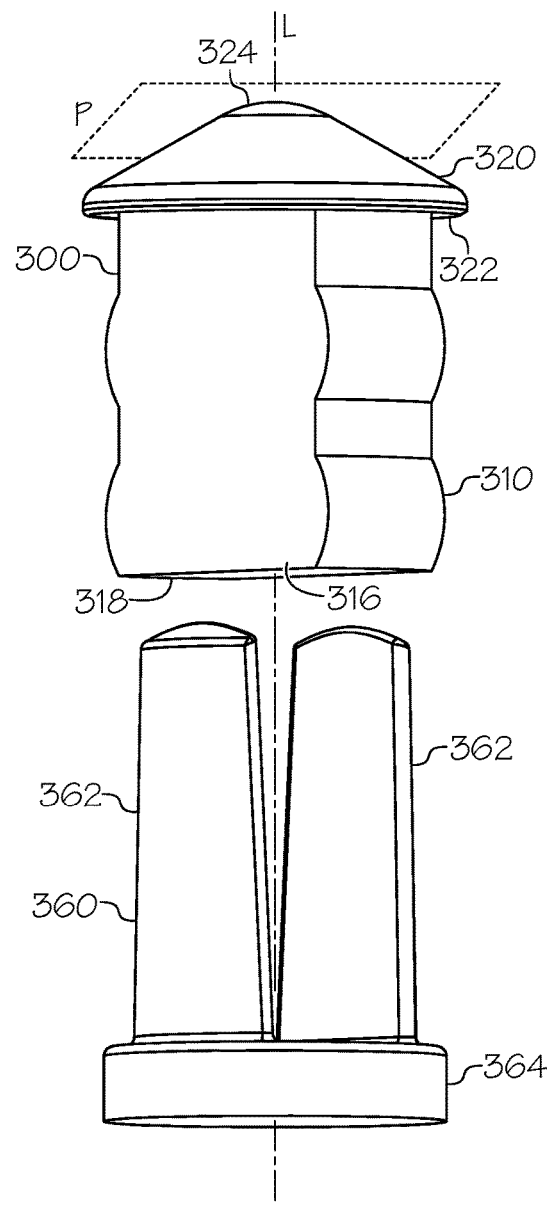

In a third aspect, examples of which are shown in FIGS. 10A-B, a check valve 300 includes a stem 310 configured to engage a bore having a predetermined internal diameter, a longitudinal channel 316 extending across an exterior surface of the stem, and an elastomeric sealing member 320 connected to one end of the stem and configured to sealingly engage with the bore. The third aspect differs from the first in that no neck is needed to interconnect the elastomeric sealing member 320 with the stem 310, and the stem may be directly connected with portions of a radially outer portion 322 of the member. As a result, the elastomeric sealing member 320 may be more resistant to inversion or damage due an anchoring of some radially outer portions 322 of the member by the stem 310.

A radially outer portion 322 of the sealing member 320 is disposed across the longitudinal channel 316 and is biased in a direction toward the opposite end 318 of the stem 310 with respect to a plane P that is coincident with a central portion 324 of the elastomeric sealing member and perpendicular to a longitudinal axis L of the stem. This yields a flap-like portion of the elastomeric sealing member 320, anchored by the central portion 324 of the member to the stem 310, and optionally, radially outer portions 322 adjoining the lateral sides of the channel 316, that is biased in a direction toward the channel 316. Thus the radially outer portion 322 disposed across the longitudinal channel 316 will seal against the bore when moved oppositely from the direction of the bias. A fluid may flow through the longitudinal channel 316 and around at least that radially outer portion 322 of elastomeric sealing member 320 in the direction of the bias, but is substantially prevented from flowing around the elastomeric sealing member in a direction opposite to the direction of the bias, when the check valve is installed within the bore.

Embodiments of the third aspect may, in particular but not exclusively versus the other aspects discussed above, be combined with an installation tool 360 for retrofit installation in pre-existing process lines or plumbing that includes an internal bore. The insertion tool 360 may have one prong 362, or optionally a plurality of prongs 362, configured for insertion into the channel(s) 316 of the stem 310. The prong(s) 362 may have a length greater than the longitudinal extent of the channel(s) 316. During insertion within a bore 10, a prong 362 exerts a force against the elastomeric sealing disk 320, and the stem 310 experiences a fictional force with the walls of the bore, stretching the stem and causing its exterior to shrink in diameter, reducing the frictional force exerted on the stem and thus required levels of insertion force during installation. The insertion tool may optionally include a stop 364 positioned at the base of the prong 362 or plurality of prongs 362 to abut against the opposite end of the stem 318 and limit the stretching of the stem 310 in order to prevent potential damage to the check valve 300.

The various aspects and implementations described above are intended to be illustrative in nature, and are not intended to limit the scope of the invention. Additional combinations of the individual features discussed and illustrated above are expressly contemplated and such features are not limited to use in the aspect in which they are introduced unless inherently incompatible with the other aspects as disclosed and described. Any limitations to the invention will appear in the claims as allowed.

What is claimed is:

1. A system comprising a check valve including:
   a stem configured to engage a bore having a predetermined internal diameter;
   an elastomeric sealing disk having a disk diameter greater than the predetermined internal diameter; and
   a neck interconnecting the elastomeric sealing disk with the stem;
   wherein at least a radially outer portion of the elastomeric sealing disk is biased or biasable in a selected direction away from a plane that is perpendicular to a longitudinal axis of the stem such that an effective diameter of the radially outer portion is greater than or equal to the predetermined internal diameter, but less than the disk diameter, when the elastomeric sealing disk is so biased;
   wherein the stem defines at least one channel for fluid communication between the neck and an end of the stem opposite the neck such that a fluid may flow around the elastomeric sealing disk in the selected direction and through the channel, but is substantially prevented from flowing around the elastomeric sealing disk in a direction opposite to the selected direction, when the check valve is installed within the bore, wherein the stem includes a recess disposed in the end of the stem opposite the neck, the recess having a longitudinal extent; and an insert having an outside diameter that is larger than the inside diameter of the recess, wherein the insert serves to expand the stem surrounding the recess to produce a compression lock against the bore.

2. The system of claim 1, wherein the elastomeric sealing disk is biased in the selected direction by an intrinsic configuration of the elastomeric sealing disk.

3. The system of claim 1, wherein the stem includes a plurality of protrusions for engaging a wall of the bore interspaced with a plurality of gaps into which the protrusions may distort.

4. The system of claim 1 wherein the stem includes a plurality of axially-extending, circumferentially spaced lugs configured to engage the bore, where each lug has a varying radially-outmost surface to provide a plurality of axially-spaced apart protrusions configured to engage the bore with axially-extending gaps positioned between adjacent protrusions.

5. The system of claim 1 wherein the plane is coincident with a central portion of the elastomeric sealing disk.

6. The system of claim 1 further comprising a tubular component having the bore with the predetermined internal diameter, wherein the stem engages the bore, wherein the disk diameter, when the disk is unbiased and not positioned in the bore, is greater than the predetermined internal diameter, wherein the at least a radially outer portion of the elastomeric sealing disk is biased in the selected direction away from the plane such that the effective diameter of the radially outer portion is equal to the predetermined internal diameter and less than the disk diameter, wherein the stem defines the at least one axially-extending channel providing fluid communication between the neck and the end of the stem opposite the neck such that fluid may flow around the elastomeric sealing disk in the selected direction and through the channel, but is substantially prevented from flowing around the elastomeric sealing disk in a direction opposite to the selected direction.

7. A system comprising a check valve including:
a stem configured to engage a bore having a predetermined internal diameter;
an elastomeric sealing disk having a disk diameter greater than the predetermined internal diameter; and
a neck interconnecting the elastomeric sealing disk with the stem;
wherein at least a radially outer portion of the elastomeric sealing disk is biased or biasable in a selected direction away from a plane that is perpendicular to a longitudinal axis of the stem such that an effective diameter of the radially outer portion is greater than or equal to the predetermined internal diameter, but less than the disk diameter, when the elastomeric sealing disk is so biased;
wherein the stem defines at least one channel for fluid communication between the neck and an end of the stem opposite the neck such that a fluid may flow around the elastomeric sealing disk in the selected direction and through the channel, but is substantially prevented from flowing around the elastomeric sealing disk in a direction opposite to the selected direction, when the check valve is installed within the bore, wherein the stem includes a recess disposed in the end of the stem opposite the neck, the recess having a longitudinal extent; and an installation tool having an end portion sized for insertion within the recess but with a length greater than the longitudinal extent of the recess.

8. The system of claim 7, wherein the installation tools includes an outwardly projecting step that abuts against the end of the stem opposite the neck to limit stretching of the stem.

9. The system of claim 1, wherein the stem is a first stem and the neck is a first neck, and further comprising a second stem, disposed opposite the first stem from the elastomeric sealing disk, that is connected to the elastomeric sealing disk by a second neck.

10. A system comprising a check valve including:
a resilient stem assembly configured to engage a bore having a predetermined internal diameter; and
an elastomeric sealing disk having a disk diameter greater than the predetermined internal diameter;
wherein at least a radially outer portion of the elastomeric sealing disk is biased or biasable in a selected direction away from a plane that is perpendicular to a longitudinal axis of the stem assembly, such that an effective diameter of the radially outer portion is greater than or equal to the predetermined internal diameter, but less than the disk diameter, when the elastomeric sealing disk is so biased;
wherein the stem assembly comprises an open framework connected to the elastomeric sealing disk, and is configured such that a fluid may pass around the elastomeric sealing disk in the selected direction and through the open framework, but is substantially prevented from passing around the elastomeric sealing disk in a direction opposite to the selected direction, when the check valve is installed within the bore, wherein the stem assembly includes a recess disposed in the end of the stem assembly opposite the elastomeric sealing disk, the recess having a longitudinal extent; and
an insert having an outside diameter that is larger than the inside diameter of the recess, wherein the insert serves to expand the stem assembly surrounding the recess to produce a compression lock against the bore.

11. The system of claim 10, wherein the elastomeric sealing disk is biased in the selected direction by an intrinsic configuration of the elastomeric sealing disk.

12. The system of claim 10, wherein the stem assembly comprises the open framework upon which the sealing disk is overmolded.

13. The system of claim 10, wherein the open framework is intrinsically resilient so as to engage a wall of the bore.

14. A system comprising a check valve including:
a stem configured to engage a bore having a predetermined internal diameter;
a longitudinal channel extending across an exterior surface of the stem; and
an elastomeric sealing member connected to one end of the stem and configured to sealingly engage the bore;
wherein a radially outer portion of the elastomeric sealing member is configured to be disposed across the channel and is biased in a direction toward the opposite end of the stem with respect to a plane that is perpendicular to a longitudinal axis of the stem, such that the radially outer portion will seal against the bore when moved oppositely from the direction of the bias;
wherein the valve is configured such that a fluid may flow around the elastomeric sealing member in the direction of the bias and through the channel, but is substantially prevented from flowing around the elastomeric sealing member in a direction opposite to the direction of the bias, when the check valve is installed within the bore, wherein the stem includes a recess disposed in the end of the stem opposite the elastomeric sealing member, the recess having a longitudinal extent; and an installation tool having a prong configured for insertion into the longitudinal channel, the prong having a length greater than a longitudinal extent of the channel.

15. The system of claim 14, wherein the radially outer portion of the elastomeric sealing member adjoining lateral sides of the longitudinal channel is directly connected to the stem.

16. The system of claim 14, wherein the installation tool includes a stop positioned at the base of the prong to abut against the opposite end of the stem.

17. A system comprising a check valve including:

a stem configured to engage a bore having a predetermined internal diameter;

an elastomeric sealing member coupled to the stem and having, when undeformed and not positioned in the bore, a diameter greater than the predetermined internal diameter; and wherein at least a radially outer portion of the elastomeric sealing member extends away, in a selected direction, from a plane that is oriented perpendicular to a longitudinal axis of the stem, and wherein the at least a radially outer portion is deformable such that when the check valve is positioned in the bore the elastomeric sealing member has a diameter matching the internal diameter of the bore;

wherein the stem defines at least one channel providing fluid communication along the stem in an axial direction when the check valve is positioned in the bore; and wherein the sealing member is configured, when the check valve is positioned in the bore, to substantially prevent fluid from flowing past the sealing member in a direction opposite to the selected direction, and to more easily allow fluid to flow past the sealing member in the selected direction as compared to in the direction opposite to the selected direction, wherein the stem includes a recess disposed in the end of the stem opposite the elastomeric sealing member, the recess having a longitudinal extent; and an insert having an outside diameter that is larger than the inside diameter of the recess, wherein the insert serves to expand the stem surrounding the recess to produce a compression lock against the bore.

* * * * *